April 7, 1942.        K. STRAUB        2,278,679
BATTERY IGNITION SYSTEM FOR INTERNAL COMBUSTION ENGINES
Filed Jan. 18, 1940
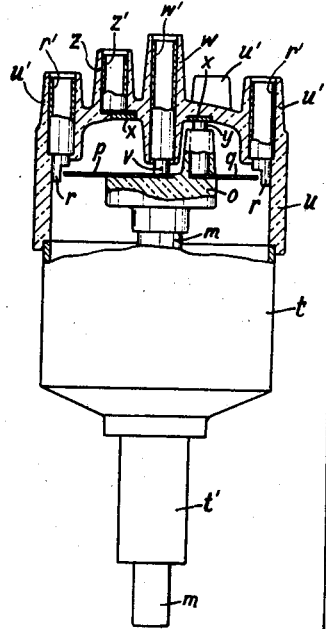
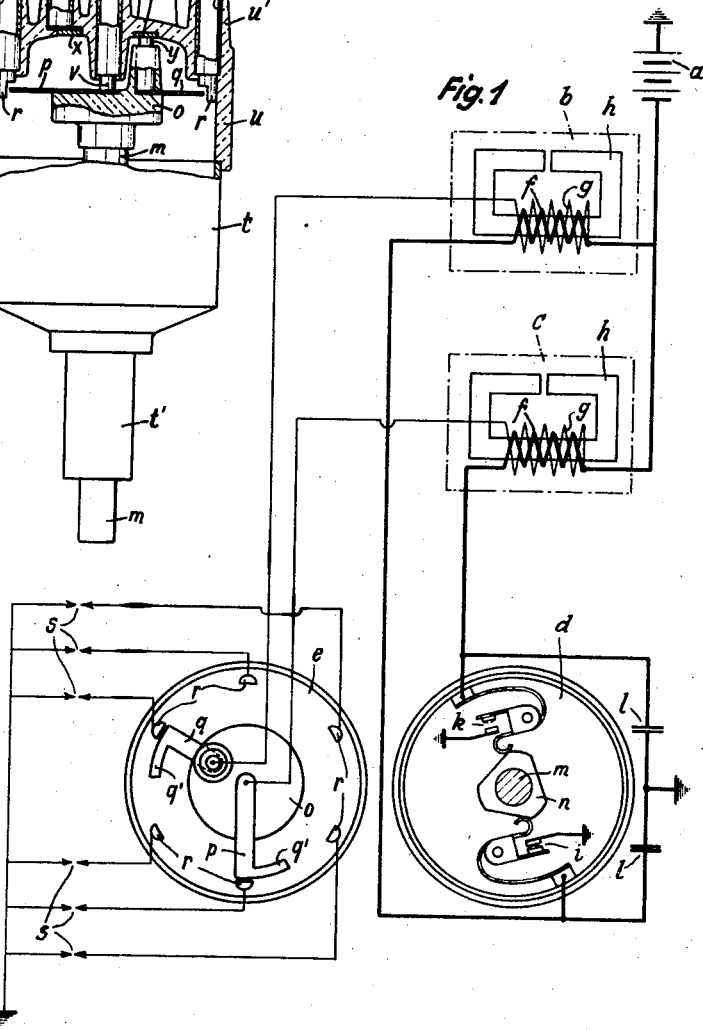
Inventor
Karl Straub
by Roy F. Steward
his attorney Patented Apr. 7, 1942

2,278,679

UNITED STATES PATENT OFFICE 2,278,679

BATTERY IGNITION SYSTEM FOR INTERNAL COMBUSTION ENGINES

Karl Straub, Stuttgart, Germany, assignor to Robert Bosch Gesellschaft mit beschrankter Haftung, Stuttgart, Germany Application January 18, 1940, Serial No. 314,515
In Germany January 12, 1939

3 Claims. (Cl. 123—148)

This invention relates to a battery ignition system for internal combustion engines of the injection type and more particularly for engines of this type in which the compression ratio is less than that required to produce compression ignition.

In heavy oil internal combustion engines in which the heat produced by compression causes self-ignition of the injected fuel, the firing point is defined by the moment in which an injection pump starts injecting the fuel while with light oil carburettor motors the firing point is defined by the sparks produced at the spark plugs. On the other hand in cylinders of low pressure heavy oil internal combustion engines of the injection type, in which ignition is effected by a timed ignition system, the explosions take place only after the air drawn into the engine cylinders with formation of whirls and the injected fuel have been mixed to form an explosive fuel-air mixture at the spark plugs. The period of time required for this mixing operation varies with the different operating conditions of the engine. Therefore, the igniting devices used in such combustion engines must be able to produce and maintain igniting sparks for such a period of time that ignition of the explosive fuel and air mixture is ensured in the cylinders of the engine, even under the most unfavourable conditions.

To this end, battery igniting systems are used including an ignition distributor or timer which cooperates with at least two ignition coils each of which produces the sparks for a part of the cylinders only. Now, according to the present invention ignition coils are used having a high secondary inductance, together with an ignition distributor comprising at least two interrupters, one for each ignition coil. The interrupters are adjusted to close the circuit for a period which is longer than the interval between two successive ignitions in the engine. A long period of closure of the interrupters permits the ignition coils to absorb a sufficiently large primary energy, even with high speed. Moreover a high secondary inductance of at least 80 henries obtained, for example, by a closed iron core, and a low loss construction of the ignition coils by means of an iron core comprising high grade iron alloy sheets aids in the maintenance of the spark during the whole period where the interrupter circuit is open, so that ignition of the explosive fuel and air mixture is ensured in the cylinders.

The invention will be better understood by reference to the following detailed description in connection with the accompanying drawing showing by way of example one embodiment of the invention and in which:

Fig. 1 is a circuit diagram showing a battery ignition system for a six cylinder low pressure heavy oil internal combustion engine of the injection type having the invention applied thereto; the components of the ignition system have been drawn apart for the sake of better illustration.

Fig. 2 is a section through a distributor or timer for use in an ignition system as per Fig. 1.

Referring to Fig. 1, the ignition device comprises a battery $a$, two ignition coils $b$ and $c$, an interrupting device $d$ and an ignition distributor $e$. The primary windings $f$ and the secondary windings $g$ of the ignition coils $b$ and $c$ are wound on closed iron cores $h$. The interrupter device comprises two interrupters $i$ and $k$; the interrupter $i$ cooperates with the ignition coil $b$ while the interrupter $k$ cooperates with the ignition coil $c$. Condensers $l$ are connected across the interrupters $i$ and $k$. By means of a cam $n$ secured on the shaft $m$ of the distributor and comprising three projections or elevations each interrupter $i$ and $k$ is opened three times during one revolution of the shaft $m$, said interrupters operating alternately, so that altogether six high tension impulses are produced alternately by the two ignition coils $b$ and $c$ which are imparted to the spark plugs $s$ from the high tension windings $g$ through distributing fingers $p$ and $q$ secured on the distributing rotor $o$ and rotating with the distributor shaft $m$, and the distributing segments $r$, to produce successive ignitions in the engine.

It will thus be understood that ignition coil $b$ produces the sparks in three of the six spark plugs $s$ in the six cylinders of the engine while the ignition coil $c$ produces the sparks in the remaining three spark plugs. The interrupters $i$ and $k$ are open each over an angle of 40°—as measured at the distributor shaft—and closed over an angle of 80°, while the interval between two successive ignitions amounts to 60° in a six cylinder motor. Depending on the time of maintenance of the ignition sparks which as above mentioned may in this case extend over an angle of 40°, at the distributor shaft, the distributor fingers $p$ and $q$ of course must be provided with projections $p'$ and $q'$ of suitable length.

Referring to Fig. 2, a distributor casing $t$ comprising a shank $t'$ is shown in which the distributor shaft $m$ is supported. A distributor member $u$ of artificial resin is mounted on the upper edge of the distributor casing $t$ in which the interrupter device d, Fig. 1, is accommodated. The distributor segments r are inserted in the connection pieces u' of the distributor member u and electrically connected to plug bushes r'. The rotor o of the timer with its two distributor fingers p and q is secured on the end of the timer shaft m extending into the casing t of the distributor. The distributor finger p is connected to a plug bush w' in a connecting piece w through a carbon brush v, while the distributor finger q is connected to a plug bush z' in a connecting piece z, through a carbon brush y sliding on a slip ring x embedded in the distributor member u. The high tension conductors connecting the ignition coils b and c and the distributor u are engaged in the connecting pieces w and z while the spark plug cables are engaged in the connecting pieces u'.

The apparatus of the present invention has been described in detail with reference to specific embodiments. It is to be understood, however, that the invention is not limited by such specific reference but is broader in scope and capable of other embodiments than those specifically described and illustrated in the drawing.

I claim:

1. A battery ignition system for low pressure heavy oil internal combustion engines of the injection type, comprising, in combination, an engine operated cam, at least two interrupters operated alternately by said cam, at least two ignition coils each having a high secondary inductance and having their primary coils connected respectively with said interrupters whereby said coils operate alternately to produce successive ignitions in the engine and each coil producing the spark for only a part of the cylinders of said engine, a distributor having a plurality of segments connected to spark plugs and having a rotor carrying a plurality of electrically insulated distributor fingers connected respectively with the secondary coils of said ignition coils, said cam and interrupters being arranged to open the primary circuit of one ignition coil while the primary circuit of the other coil is maintained closed for a period of time exceeding the interval between two successive ignitions in the engine whereby a spark impulse of considerable extension is produced when said last-mentioned primary circuit is broken and said segments and distributor fingers being so arranged and having cooperating opposed surfaces of substantial extent whereby said distributor fingers operate alternately to distribute said extended sparking impulses.

2. A battery ignition system for low pressure heavy oil internal combustion engines of the injection type, comprising, in combination, an engine operated cam, at least two interrupters operated alternately by said cam, at least two ignition coils having their primary coils connected respectively with said interrupters whereby said coils operate alternately to produce successive ignitions in the engine and each coil producing the spark for only a part of the cylinders of said engine, each ignition coil having a secondary inductance amounting to at least 80 henries at maximum flux, a distributor having a plurality of segments connected to spark plugs and having a rotor carrying a plurality of electrically insulated distributor fingers connected respectively with the secondary coils of said ignition coils, said cam and interrupters being arranged to open the primary circuit of one ignition coil while the primary circuit of the other coil is maintained closed for a period of time exceeding the interval between two successive ignitions in the engine whereby a spark impulse of considerable extension is produced when said last-mentioned primary circuit is broken and said segments and distributor fingers being so arranged and having cooperating opposed surfaces of substantial extent whereby said distributor fingers operate alternately to distribute said extended sparking impulses.

3. A battery ignition system for low pressure heavy oil internal combustion engines of the injection type, comprising, in combination, an engine operated cam, at least two interrupters operated alternately by said cam, at least two ignition coils having their primary coils connected respectively with said interrupters whereby said coils operate alternately to produce successive ignitions in the engine and each coil producing the spark for only a part of the cylinders of said engine, a distributor having a plurality of segments connected to spark plugs and having a rotor carrying a plurality of electrically insulated distributor fingers connected respectively with the secondary coils of said ignition coils, said cam and interrupters being arranged to open the primary circuit of one ignition coil while the primary circuit of the other coil is maintained closed for a period of time exceeding the interval between two successive ignitions in the engine whereby a spark impulse of considerable extension is produced when said last-mentioned primary circuit is broken and said segments and distributor fingers being so arranged and having cooperating opposed surfaces of substantial extent whereby said distributor fingers operate alternately to distribute said extended sparking impulses, the secondary inductance of the ignition coils and the primary energy absorbed by the ignition coils being of such magnitude that the ignition spark impulses of each coil are maintained over the interrupting period of its interrupter, at least at high speed of the engine.

KARL STRAUB.